United States Patent
Scow et al.

(10) Patent No.: US 6,937,352 B1
(45) Date of Patent: Aug. 30, 2005

(54) POSITIONING DEVICE FOR RAM TESTING SYSTEM

(75) Inventors: Robert A. Scow, Rancho Palos Verdes, CA (US); David E. Daws, San Pedro, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 10/959,682

(22) Filed: Oct. 6, 2004

(51) Int. Cl.[7] .................. G01B 11/28; G01B 11/24; G01B 11/14; G01N 21/00; G01N 21/86
(52) U.S. Cl. .................. 356/630; 356/614; 356/622; 356/237.2; 250/559.38
(58) Field of Search .................. 356/622, 237.1, 356/614, 630, 237.2; 250/559.22, 559.38

(56) References Cited

U.S. PATENT DOCUMENTS

| | | | |
|---|---|---|---|
| 5,355,083 A | 10/1994 | George et al. | 324/229 |
| 5,525,903 A | 6/1996 | Mandl et al. | 324/230 |
| 5,757,498 A | 5/1998 | Klein et al. | 356/375 |
| 5,857,625 A | 1/1999 | Klein et al. | 239/289 |
| 5,868,840 A | 2/1999 | Klein | 118/300 |
| 6,563,308 B2 | 5/2003 | Nagano et al. | 324/230 |
| 6,583,869 B1 * | 6/2003 | Sheridan | 356/153 |
| 6,608,495 B2 | 8/2003 | Sarfaty et al. | 324/752 |
| 6,700,370 B2 | 3/2004 | Chen | 324/230 |
| 6,788,244 B1 * | 9/2004 | Tam | 342/22 |

* cited by examiner

Primary Examiner—Layla Lauchman
Assistant Examiner—Gordon J. Stock, Jr.
(74) Attorney, Agent, or Firm—Louis L. Dachs

(57) ABSTRACT

The invention is a device for positioning a hand-held RAM inspection system for measuring the thickness of a RAM coating. In detail, the invention includes a housing containing the RAM coating inspection system, the housing having a longitudinal axis. Three laser distance-measuring devices are circularly mounted on the housing at 120 degrees from each other; the laser distance measuring devices are for determining the required distance and orientation of the RAM inspection system from the RAM coating surface. An electrical controller circuit is coupled to the three lasers and the RAM inspection system for triggering the RAM inspection system to measure the RAM material when the three lasers indicate that the housing is at the proper distance and orientation to the RAM coating surface.

2 Claims, 3 Drawing Sheets

POSITIONING DEVICE FOR RAM TESTING SYSTEM

BACKGROUND OF THE INVENTION

1. Field of the Invention

RAM coatings contain magnetic particles incorporated into a binder, such as urethane The thickness and loading of the coating must be controlled in order to obtain the proper radar absorption properties. One approach is to use a hand held thickness measuring device as disclosed in U.S. Pat. No. 5,012,248 "Radar Absorption Material Thickness Measuring Device" by J. R. Munroe, et al. This invention comprises of a radiating element assembly for transmitting RF energy to and recovering reflected RF energy from the coating. A visual display is provided to indicate the thickness of the coating. A portable power supply is coupled to the detector assembly making it portable. This device is highly suitable for use in checking repairs made in the field. While this device works well, it requires physical contact with the coating surface.

2. Description of Related Art

RAM coatings contain magnetic particles incorporated into a binder, such as urethane The thickness and loading of the coating must be controlled in order to obtain the proper radar absorption properties. One approach is to use a hand held thickness measuring device as disclosed in U.S. Pat. No. 5,012,248 "Radar Absorption Material Thickness Measuring Device" by J. R. Munroe, et al. This invention comprises of a radiating element assembly for transmitting RF energy to and recovering reflected RF energy from the coating. A visual display is provided to indicate the thickness of the coating. A portable power supply is coupled to the detector assembly making it portable. This device is highly suitable for use in checking repairs made in the field. While this device works well, it requires physical contact with the coating surface.

It is common to apply RAM coatings by use of hand and robotic spray techniques. Since coating thickness is critical, it is desirable to check the coating thickness prior to it curing. This would make the by J. R. Munroe, et al. device unusable because of the damage to the coating that would occur upon contact of the device onto the wet surface. This problem can be avoided by the use of radiating and receiving electromagnetic transmission horns angled toward each other. The signal from the radiating horn is directed at the surface and the return signal is received by the receiving horn. Thus the measurement is limited to relatively large areas. This prevents accurate readings of significantly curved surfaces. Furthermore, it cannot be used in confined areas such as the engine inlet ducts on aircraft.

Conventional inspection techniques, such as those which use ultrasonic techniques, are unsuitable, for radar absorption is not measured, and because ultrasound does not propagate well in loaded urethane or silicon based materials. Thus it is possible that the measured thickness of the coating may be correct, but the area may not be properly loaded with magnetic materials.

In U.S. Pat. No. 6,788,244B1 Inspection Device For Radar Absorbing Materials by K. K. Tam, an inspection device is disclosed for non-contact inspection of RAM surface coatings containing radar-absorbing materials on a conductive surface or substrate. In detail, the device includes a first circuit for transmitting an electromagnetic signal to the assembly. The first circuit includes a radio frequency (RF) source of electromagnetic radiation coupled to a waveguide made of a conductive material coupled in series to a second waveguide made of a dielectric material with their longitudinal axes aligned. A second circuit is provided for receiving the portion of the electromagnetic radiation transmitted by the first circuit reflected from the assembly. The second circuit includes a third waveguide made of a conductive material coupled in series to a fourth waveguide made of a dielectric material with their longitudinal axes aligned. The second circuit further includes a RF power detector coupled to the third waveguide. Thus an electromagnetic signal is transmitted from the first waveguide to the second waveguide on to the assembly and the portion of the electromagnetic signal reflected off the assembly is received by said fourth waveguide and transmitted to said third waveguide and to the RF power detector. The longitudinal axes of the first and second waveguides are at an acute angle to the longitudinal axis of the third and fourth waveguides. This angle is preferably 10 degrees.

The second and fourth waveguides are solid and made of a dielectric material such as Polytetrafluoroethylene. It is important to provide an impedance match between the first and second waveguides and the third and fourth waveguides, and the first and fourth waveguides to free space. This is accomplished by having the center portion of the second and fourth waveguides fit within the first and third waveguides. A portion of the second and third waveguides that extend into the first and third waveguides are tapered along their top and bottom surfaces to a relatively sharp edge at the end thereof. A portion of the waveguides on the ends extending out of the first and third wave guides are tapered along their sides to a relatively sharp edge.

The output from the RF power detector is fed to a programmable gain amplifier and thereafter to a signal digitizer. The programmable RF source and RF power detector, as well as the amplifier and signal digitizer are typically controlled by a microprocessor. The second and fourth waveguides maintain about 0.75 inch away from the surface of the assembly being inspected. Thus the device is typically mounted on a robotic arm, such that the assembly is automatically inspected, in a manner similar to the robotic spray machines used to apply the coating. Thus the inspection process is no different from other automated inspection systems. However, this device allows the coating to be inspected prior to its curing, while still in a "wet" condition. Thus any issue associated with the material and the application process can be corrected prior to the coating curing.

However, this device was designed for use on an automated inspection line where a robotic arm can be programmed to provide the proper distance and orientation from the RAM coating being inspected. It is unsuitable in its present form for use in a hand held applications for there is no way to properly establish the required distance from and orientation to the RAM coating surface without actually contacting the test surface.

In U.S. Pat. No. 5,355,083 Non Contact Sensor And Method Using Inductance And Laser Distance Measurements For Measuring The Thickness Of A Layer Of Material Over Laying A Substrate by A. R. George, et al. discloses the use of a laser to aid in the positioning of an Inductance type coating thickness measuring device. A pair of lasers is used to measure the thickness of a coating. One laser is designed such that beam passes through the coating onto the substrate wherein it is reflected back to a sensor. The second laser is designed so that its laser beam is reflected off the coating to a second sensor. A computer is used to process the two signals and thus determine the thickness of the coating. Such a system will only work when the coating is transparent to the first laser beam. It also depends upon having the laser beams in a fixed position. It would also be ineffective in a hand held device, since the two lasers will not provide sufficient feedback to obtain the proper distance from and orientation to the test surface.

In U.S. Pat. No. 5,868,840 Paint Gun Incorporating A Laser by R. J. Klein, II, et al. a pair of lasers are used to indicate the proper distance from a surface being coated by a spray gun. The lasers are positioned such that the beams become co-incident when the gun is the proper position from the surface being coated. However, it does not control the angle of the spray gun nozzle to the surface.

Thus, it is a primary object of the invention to provide a device for establishing the required distance from and perpendicularity to a RAM surface for a non-contacting hand held coating measurement system.

It is another primary object of the invention to provide a device for establishing the required distance from and perpendicularity to a RAM surface for a non-contacting hand held coating measurement system that is compact.

It is a further object of the invention to provide a device for establishing the required distance from and perpendicularity to a RAM surface for a non-contacting hand held coating measurement system that can automatically determine the proper distance and orientation to a RAM coating surface.

SUMMARY OF THE INVENTION

The device is used for the positioning of a hand-held RAM inspection system. In detail, the device includes a hollow housing having a longitudinal axis containing the RAM inspection system. Three laser distance-measuring devices are circularly mounted on the housing at 120 degrees from each other. The laser distance measuring devices enable determining the required distance and orientation of the RAM inspection system from the RAM surface. A computer is coupled to the three lasers and the RAM inspection system for triggering the RAM inspection system to measure the RAM material when the three lasers indicate that the housing is at the proper distance and is perpendicular to the RAM surface. Preferably, the three lasers are mounted on the housing such that the laser beams from the three lasers contact the surface on the circumference of a one inch diameter circle when the housing is at the proper distance from the RAM surface for making a measurement.

The housing includes a handle with a start-measurement button. The button is coupled to the computer in such a fashion that, operation of the RAM inspection system will not operate until it is in the proper position, both as to distance and in a perpendicular position to the RAM surface being inspected.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

DESCRIPTION OF THE PREFERRED EMBODIMENT

Figure 1:
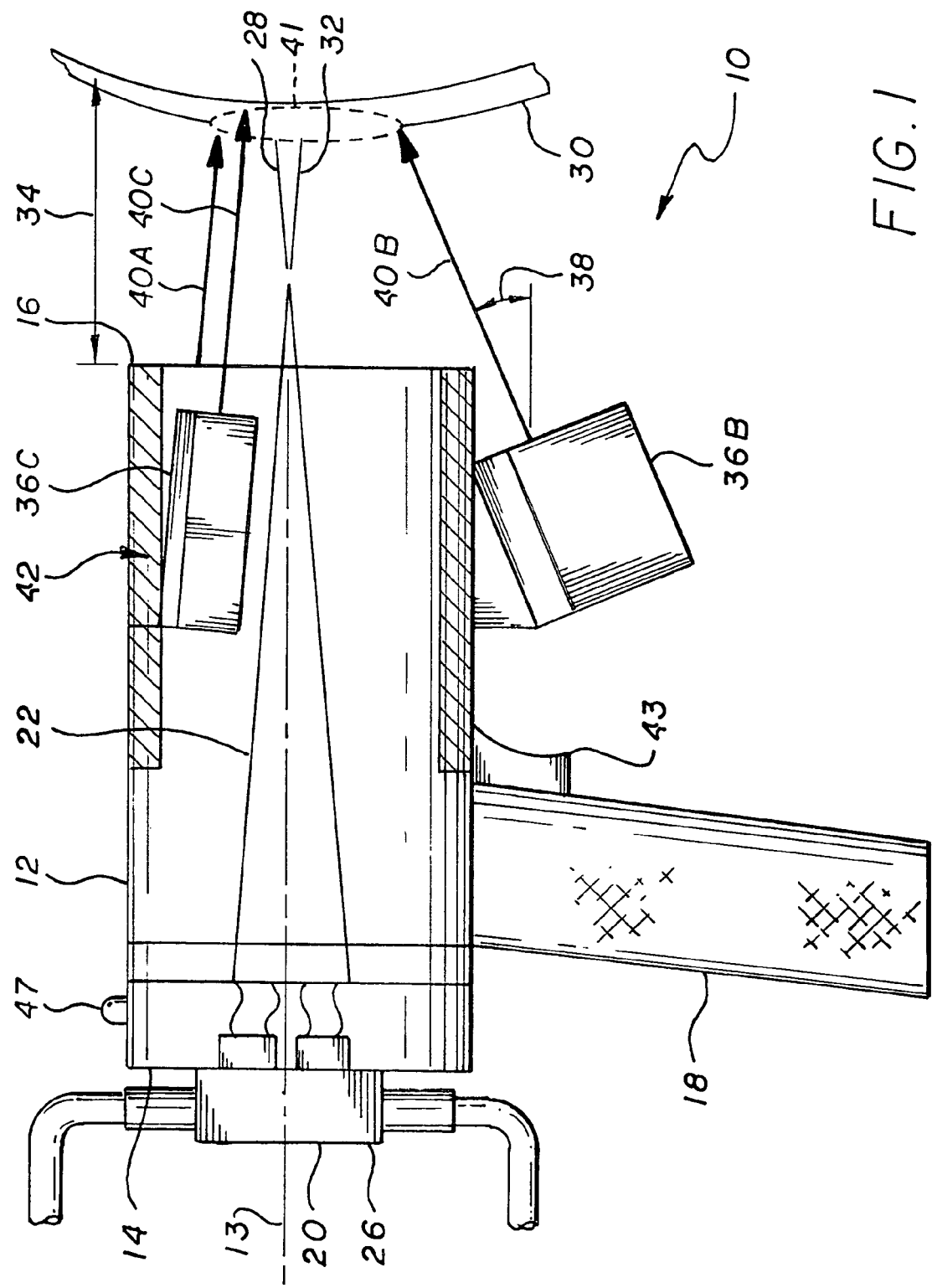
FIG. 1 is pictorial side view of a hand held RAM surface inspection device incorporating the laser positioning system.
Figure 2:
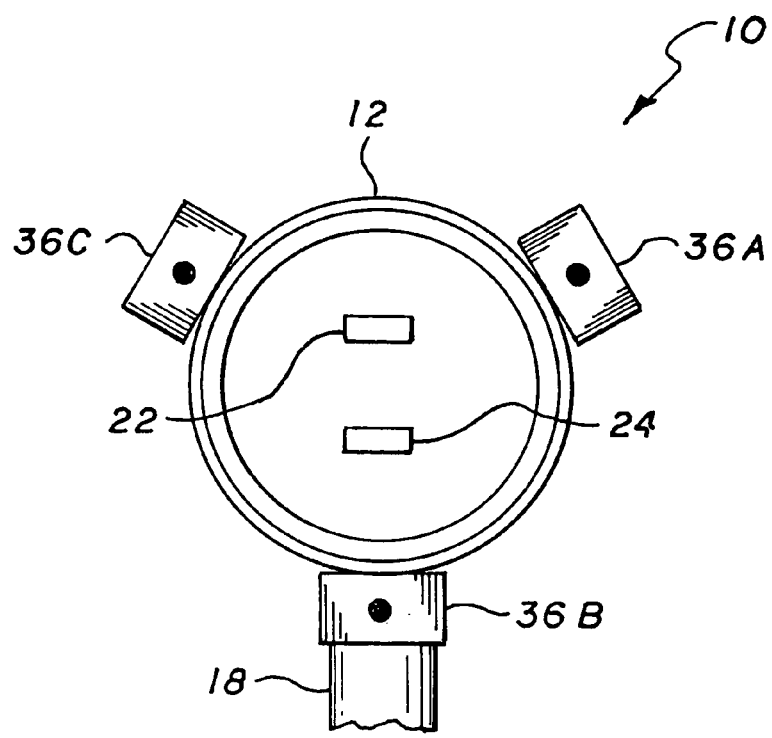
FIG. 2 is a pictorial front view of the hand held device shown in FIG. 1
Figure 3:
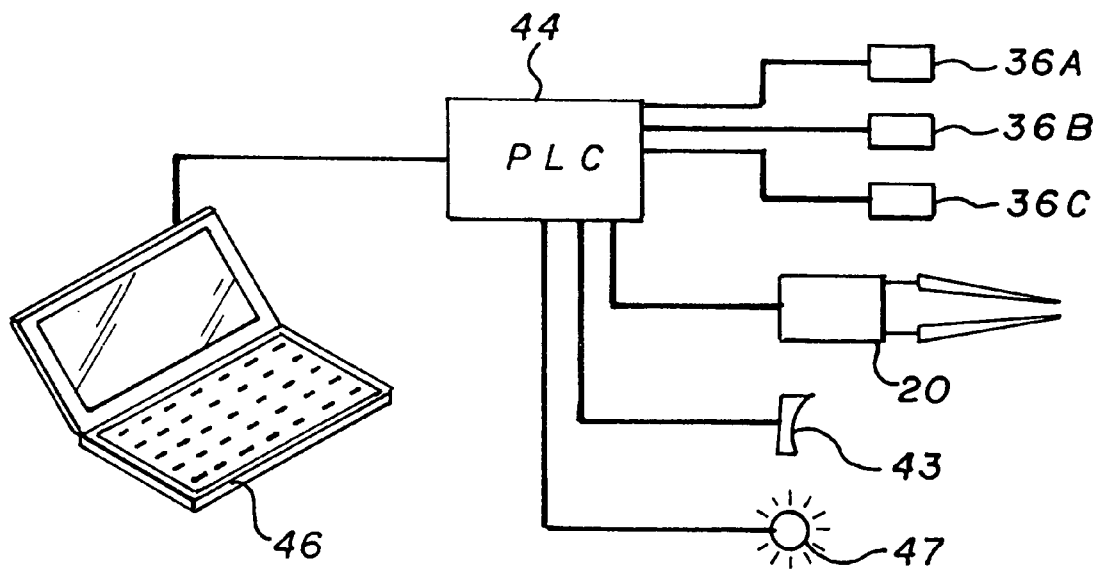
FIG. 3 is a schematic of the electrical circuit for the laser positioning system.

Referring to FIGS. 1–3, the RAM inspection device, generally indicated by numeral 10, includes a hollow housing 12 having longitudinal axis 13 and a closed off first end 14 and open second end 16. A handle 18 is provided so that the device can be hand held. The housing 12 contains the thickness inspection system 20. The inspection system 20 is fully discussed in U.S. Pat. No. 6,788,244B1 Inspection Device For Radar Absorbing Materials by K. K. Tam, herein incorporated by reference. Suffice it say, the inspection system 20 includes a transmitting horn 22 and receiving horn 24 angle toward each other and associated power supplies and electronics 26 that extend out of the second end 16. An electromagnetic signal 28 is transmitted to the RAM surface 30 to measure. The return signal 32, attenuated by the RAM surface 30 is measured and compared to the transmitted signal 28. The difference is proportional to the thickness of the RAM material. However, the distance 34 of the transmitting and receiving horns 22 and 24 to the surface 30 is critical, because the RF attenuation is highly affected by the distance from the surface.

To insure that this distance 34 is maintained during tests, a laser positioning system, generally indicated by numeral 36 is included. The system 36 includes three laser range finders 36A, 36B and 36C circumferentially mounted on the housing 12, 120 degrees apart and angled toward the longitudinal axis at an angle 38. The angle 38 is selected such that the horns 22 and 24 are at the proper distance 34 when the laser beams 40A, 40B and 40C, from the laser range finders 36A, 36B and 36C, respectively, strike the surface in a one inch diameter circle 41. This insures that the correct distance from the coating surface is maintained for the measurement. Suitable laser range finders are commercially available from many companies. For example, Model OADM 12 photoelectric measuring devices manufactured by Baumer Electronics and available from Access Automation LLC, Escondeto, Calif. are used in this embodiment. A circumferential metal foil shield 42 is positioned inside the housing 12 to prevent deleterious radio frequency reflections from the lasers 36A–36B.

The optical principal used in the OADM 12 device is based on triangulation. The laser puts a small bright spot on the object to be inspected. The receiver of the sensor detects the position of this spot. The angle increases with the distance of the object. The sensor basically measures this angle and then calculates the distance. The receiver inside the sensor is typically a linear photo diode array. The photodiode array is scanned by the built-in micro-controller. From the distribution of light along the diode array the controller precisely calculates the angle and from the angle it calculates the distance of the object. The sensor adapts to different colors by changing its internal sensitivity, making it nearly independent of the color of the object. A digital output is activated when no object is present within the measuring range. Another digital output activates an alarm; if there is not enough light to detect an object correctly e.g. the sensor is "soiled."

The laser range finders 36A–36C, as well as the RAM inspection system 20 and a trigger 43 are connected to a programmable logic controller (PLC) 44. For example, a Rabbit 2000, manufactured by Rabbit Semiconductors, Davis, Calif., is highly suitable. Such devices are also offered by numerous other manufacturers. The PLC 44 is in turn coupled to a computer, preferably a laptop computer 46. In operation, the operator (not shown) places the device 10 near a surface 30 to be inspected. An indication light system 47, is also coupled to the PLC 44. The indication light system 47 provides feedback cues to prompt the User to modify the position of the coating thickness measurement unit relative to the test surface such that the proper distance and perpendicularity conditions can be met to enable the coating thickness measurement processing routine.

Figure 4:
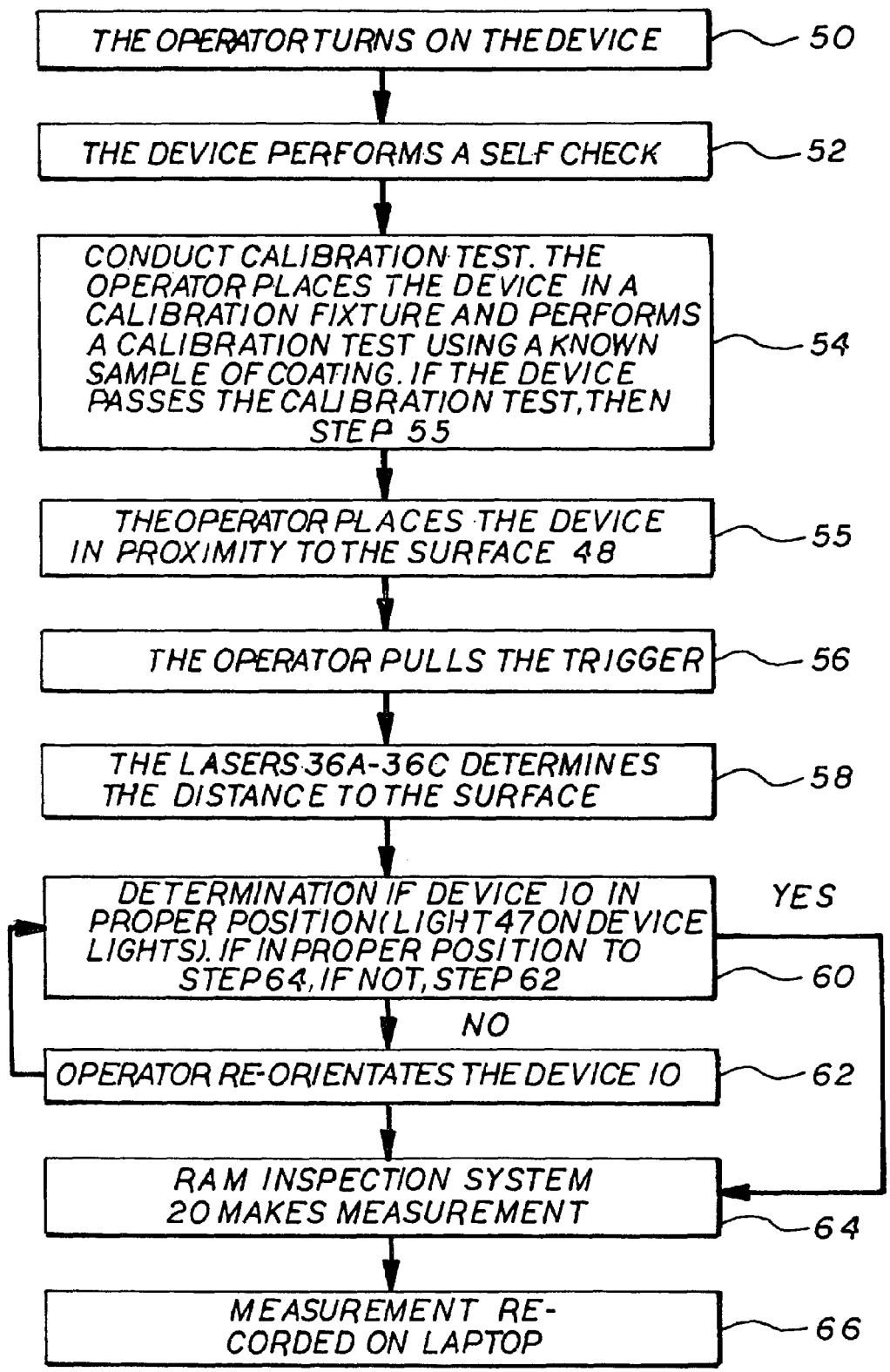
FIG. 4 is a flow chart of the processing routine for the laser positioning system.

Referring to FIG. 4, the process is as follows:

Step 50 The operator turns on the device.

Step 52 The device performs a self check.

Step 54 Conduct calibration test. The operator places the device in a calibration fixture and performs a calibration test using a known sample of coating. If the device passes the calibration test, then Step 55

Step 55 The operator places the device in proximity to the surface 46, typically one to three inches away.

Step 56 The operator pulls the trigger. At this point, the RAM inspection system continuously makes measurements. However, only when the device 10 is in the proper position will the measurement be recorded.

Step 58 The lasers 36A–36B determines the distance to the surface.

Step 60 Determination if device 10 in proper position (light system 47 on device lights). If in proper position to step 64, if not, step 62.

Step 62 Operator re-orientates the device 10.

Step 64 RAM Inspection system 20 makes measurement. As previously stated, the system 20 is continuously making measurements, but it is at this point that the measurement will be recorded.

Step 66 Measurement recorded on laptop.

Thus it can be seen that the device 10 can be used to accurately position the RAM inspection system 20. The operator can make closely positioned checks of the surface with relative ease.

While the invention has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

INDUSTRIAL APPLICABILITY

The invention has applicability to the inspection device manufacturing industry.

What is claimed is:

1. A device for positioning a RAM inspection system comprising:
   a housing containing the RAM inspection system, said housing having a longitudinal axis;
   three laser distance measuring devices circularly mounted on said housing at 120 degrees from each other, said three laser distance measuring devices for determining the required distance and orientation of the RAM inspection system from a RAM coating surface; and
   controller means coupled to said three laser distance measuring devices and the RAM inspection system, said controller means comprising:
   a trigger mounted to said housing for actuating the RAM inspection system;
   means to record RAM inspection system measurements; and
   a circuit for only allowing the RAM inspection system measurements to be recorded when said housing is positioned such that said three laser distance measuring devices are equally distant and at the required distance from the RAM coating surface.

2. The device as set forth in claim 1 wherein said three laser distance measuring devices are mounted on said housing such that the laser beams from said three laser distance measuring devices contact the RAM coating surface on the circumference of a one inch circle when the housing is at the proper distance from and orientation to the RAM coating surface for making a measurement.

* * * * *